J. W. CLARK.
Fruit Drier.
No. 233,073.　　　　　　　Patented Oct. 12, 1880.
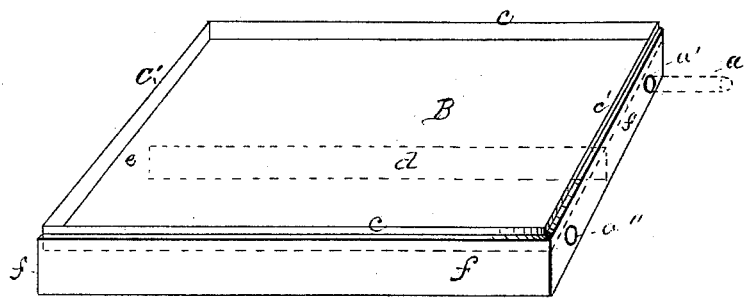
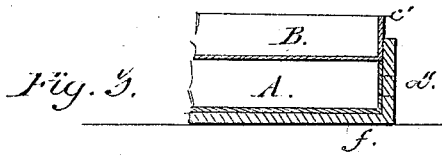
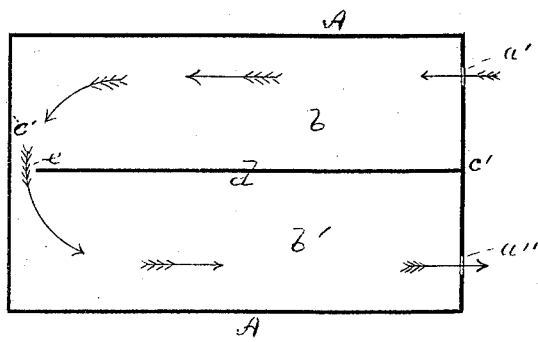
Witnesses:
T. H. Parsons.
J. R. Drake.
Jos. W. Clark
Inventor, by
J. R. Drake,
Atty.

UNITED STATES PATENT OFFICE.

JOSEPH W. CLARK, OF BUFFALO, NEW YORK.

FRUIT-DRIER.

SPECIFICATION forming part of Letters Patent No. 233,073, dated October 12, 1880.

Application filed January 28, 1880.

*To all whom it may concern:*

Be it known that I, JOSEPH W. CLARK, of Buffalo, in the county of Erie and State of New York, have made certain Improvements in Family Fruit-Driers, of which the following is a specification.

The object of this invention is to provide a portable device to dry fruits, berries, &c., for family use, by steam to be obtained from a tea-kettle or other steam-producing apparatus, by a connecting tube or pipe.

The invention consists in a non-conducting jacket placed around and under the tray and steam-chest, in combination with an open-topped case, which is provided with a bottom to hold the fruit, and itself forms the top of the steam-chest, which steam-chest has a central partition, so as to cause a circulation of steam, which is continued by means of an opening in said partition.

In the drawings, Figure 1 is a perspective, and Fig. 2 a plan, the latter showing the partition clearly. Fig. 3 is a section of the apparatus broken off, showing the non-conducting jacket.

A represents the outside construction or case, made preferably of tin, and of either square, oblong, or other convenient shape, to set on a table or stand, and to be connected with a tea-kettle by a pipe, $a$, (shown in Fig. 1 in dotted lines,) which conveys the steam therefrom into the heating-chamber $b$ through an opening, $a'$, in the side for that purpose.

B is the fruit bottom or receptacle on which is placed the fruit, &c., to be dried. It sits sufficiently below the top of the apparatus to give what depth is required, the sides $c$ $c$ and ends $c'$ $c'$ preventing the fruit from falling out.

In the center of the steam-chamber is arranged a partition, $d$, dividing it into two parts, $b$ and $b'$, but leaving a space, $e$, at the end opposite the induction and exit openings for steam, the steam coming in at $a'$, flowing through compartment $b$, round through the space $e$ into compartment $b'$, and out at the eduction-opening $a''$, thus keeping up a constant circulation of live steam under the fruit-bottom. This is a great advantage, as it prevents accumulation of condensations and keeps the bottom at a constant, even, and dry heat while in use.

To retain the heat and prevent its radiating off, I attach to or inclose the sides, ends, and bottom of the case with a jacket of felt, $f$, or other non-conductor of heat, by which the fruit-bottom B receives the best part of the steam-heat.

I am aware that there is nothing new in a non-conducting jacket or cover for steam-boilers, &c.; but none has ever been applied, so far as I am aware, to a fruit-drier.

I also know that fruit-driers have been made for family use, where hot water is put in and the device set on a stove while the drying is going on. This is open to several objections. Mine is not to be set on a stove, but on a table or stand away from the stove, and merely connected by a pipe or tube to a steam-producing vessel on the stove, as before stated.

The device is simple, cheap, effective, and durable.

I am aware driers have been made somewhat similar to mine, having drawers arranged over a steam-generating apparatus; and also devices similar to mine, but without the fruit-drying bottom; and also with packing of non-conducting material between two of several cases, and I do not claim such.

I claim—

In combination with an outside heat-retaining jacket, $f$, the open-topped case A $c$ $c'$, with the fruit-bottom B, forming the top of the steam-chamber $b$ $b'$ beneath, and with a central partition, $d$, and space $e$ for the circulation of steam therein, in connection with the induction and eduction steam-openings $a'$ $a''$, substantially as and for the purpose specified.

In witness whereof I have hereunto signed my name in the presence of two subscribing witnesses.

J. W. CLARK.

Witnesses:
J. R. DRAKE,
T. H. PARSONS.